(12) United States Patent
Dasilva et al.

(10) Patent No.: US 8,115,650 B2
(45) Date of Patent: Feb. 14, 2012

(54) RADIO FREQUENCY IDENTIFICATION BASED PERSONNEL SAFETY SYSTEM

(75) Inventors: John Dasilva, Prince George (CA); Richard Clayton Shervey, Prince George (CA)

(73) Assignee: PSST Mobile Equipment Ltd. - Richard Shervey

( * ) Notice: Subject to any disclaimer, the term of this patent is extended or adjusted under 35 U.S.C. 154(b) by 473 days.

(21) Appl. No.: 11/822,911

(22) Filed: Jul. 11, 2007

(65) Prior Publication Data

US 2008/0018472 A1 Jan. 24, 2008

Related U.S. Application Data

(60) Provisional application No. 60/819,641, filed on Jul. 11, 2006.

(51) Int. Cl.
G08B 21/00 (2006.01)

(52) U.S. Cl. ............. 340/686.6; 340/539.1; 340/539.11; 340/572.1; 340/573.4

(58) Field of Classification Search .................. 340/500, 340/540, 568.1, 572.1
See application file for complete search history.

(56) References Cited

U.S. PATENT DOCUMENTS

| | | | |
|---|---|---|---|
| 4,928,101 A | 5/1990 | Favors | |
| 5,047,752 A | 9/1991 | Schorn | |
| 5,198,800 A | 3/1993 | Tozawa | |
| 5,938,710 A | 8/1999 | Lanza | |
| 5,939,986 A | 8/1999 | Schiffbauer | |
| 6,112,152 A | 8/2000 | Tuttle | |
| 6,208,260 B1 * | 3/2001 | West et al. ................. | 340/691.3 |
| 6,418,004 B1 | 7/2002 | Mather | |
| 6,484,080 B2 | 11/2002 | Breed | |
| 6,509,829 B1 | 1/2003 | Tuttle | |
| 6,621,417 B2 | 9/2003 | Duncan et al. | |
| 6,677,917 B2 * | 1/2004 | Van Heerden et al. ....... | 343/897 |
| 6,703,930 B2 | 3/2004 | Skinner | |
| 6,747,562 B2 | 6/2004 | Giraldin et al. | |
| 6,784,800 B2 | 8/2004 | Orzechowski | |
| 6,825,754 B1 | 11/2004 | Rolin | |
| 6,831,562 B2 | 12/2004 | Rodgers et al. | |
| 6,853,303 B2 | 2/2005 | Chen et al. | |
| 6,853,531 B2 | 2/2005 | Mather | |
| 6,853,894 B1 | 2/2005 | Kolls | |
| 6,861,959 B1 | 3/2005 | Torres Sabate et al. | |
| 6,888,459 B2 | 5/2005 | Stilp | |
| 6,894,614 B2 | 5/2005 | Eckstein et al. | |
| 6,903,656 B1 | 6/2005 | Lee | |
| 6,904,000 B1 | 6/2005 | Lee | |

(Continued)

OTHER PUBLICATIONS

Workplace Safety & Insurance Board—Jul. 10, 2006 http://www.wsib.on.ca/wsib/wsibsite.nsf/public/pedestriansmobileeequip.
Bostwick, J.—Forklift Fatalities in Illinois. Health and Hazardous Substances Registry Newsletter (Illinois Department of Public Health) Winter 1998:4-5.

*Primary Examiner* — Brent Swarthout
*Assistant Examiner* — Sara Samson

(57) ABSTRACT

Disclosed is a method and apparatus for selectively immobilizing equipment to ensure the safety of a proximate worker. The apparatus comprises an article of clothing wearable by the proximate worker, a sensor and a stopping means for stopping the movement of a portion of the equipment in response to the sensing. The article of clothing has a RFID tag having an antenna distributed about the article so as to substantially surround a worker wearing the article of clothing. The sensor senses the proximity of the RFID tag to a portion of the equipment. The method comprises sensing the proximity of the RFID tag to a portion of the equipment and stopping the movement of a portion of the equipment in response to the sensing.

12 Claims, 6 Drawing Sheets

U.S. PATENT DOCUMENTS

| | | | |
|---|---|---|---|
| 7,002,526 B1 * | 2/2006 | Adams et al. | 343/718 |
| 7,015,817 B2 | 3/2006 | Copley et al. | |
| 7,034,683 B2 | 4/2006 | Ghazarian | |
| 7,034,684 B2 | 4/2006 | Boman et al. | |
| 7,038,573 B2 | 5/2006 | Bann | |
| 7,042,359 B2 | 5/2006 | Clucas | |
| 2006/0087443 A1 * | 4/2006 | Frederick et al. | 340/686.6 |
| 2006/0119525 A1 * | 6/2006 | Cohen et al. | 343/718 |

* cited by examiner

RADIO FREQUENCY IDENTIFICATION BASED PERSONNEL SAFETY SYSTEM

CROSS REFERENCE TO RELATED APPLICATION

This application claims priority from U.S. Provisional Patent Application No. 60/819,641 filed Jul. 11, 2006 entitled Radio Frequency Identification Based Personnel Safety System.

FIELD OF THE INVENTION

This invention relates to the field of devices insuring personnel safety, and in particular to a method and apparatus employing radio frequency identification based proximity sensing, warning and machine shut-down for collision avoidance between personnel and articulated or mobile industrial machinery.

BACKGROUND OF THE INVENTION

Workplace safety is of great importance. As the demands for efficiency in ensuring competitiveness of industries increases, so too does the size of the equipment as well as the speed at which these pieces of equipment move. It is well known that larger equipment moving at faster speeds poses a greater risk to other personnel working in the same vicinity.

Applicants are aware of statistics such as contained in a report entitled "Claims Statistics for Accidents Involving Selected Mobile Equipment" for all industries in British Columbia, Canada which indicates that for the period 2001-2005 the collective number of short term disability, long term disability and fatal claims resulting from forklifts alone amounted to 3,583 claims, and resulting number of claims from the use of forklifts, log loaders, lumber carriers, backhoes, dump trucks, bulldozers and construction loaders was 5,258 costing collectively in the order of 94 million dollars, and 313 thousand lost work days. Other statistics of which applicants are aware indicate that 30 per cent of forklift related fatalities occurred while the forklift was backing up *Bostwick, J. Forklift Fatalities in Illinois. Health and Hazardous Substances Registry Newsletter (Illinois Department of Public Health) Winter* 1998:4-5. As reported by the Workplace Safety and Insurance Board of Ontario (www.wsib.on.ca/wsib/wsibsite.nsf/public/pedestriansmobileequip) under the heading Prevention Reference, each year almost 900 workers are seriously injured by mobile equipment. It is an object of the present invention to address at least one aspect of this clear safety deficiency. Previous attempts to reduce the frequency of workplace injury from moving equipment have not been satisfactory.

As reported by Chen et al. in U.S. Pat. No. 6,853,303 which issued Feb. 8, 2005, for an RFID System and Method for Ensuring Personnel Safety, Radio Frequency Identification (RFID) Devices are low-cost, passive "smart" chips or "tags" that can be embedded in or attached to articles, products, and the like, to convey information about a product via a scanner. The smart tags may be generally small labels or the like with a miniature embedded antenna. The tags may be passive or active, the active tags requiring an internal power supply. A reader or scanner interrogates the smart tag with an electronic "trigger" signal. The tag in turn generates an electromagnetic pulse response that is readable by the scanner, the response containing the product information.

Various commercial applications have been suggested for smart tags, particularly in the area of retail marketing and sales. For example, RFID technology may be used to gather information related to consumer trends, purchasing habits, consumption rates, etc. It has also been suggested that RFID technology has promise in the areas of inventory control, manufacturing process and control, product accountability and tracking systems, etc. Manufacturers, shippers, and retailers may be able to follow a given product through their respective systems from initial production through to point of sale.

Chen et al. teach the use of identification smart tags with protective articles, such as protective clothing, eyewear, vests, face-masks, assisted breathing devices, and the like, and scanning personnel using such articles to thereby ensure that the personnel are properly outfitted with the necessary safety equipment.

As discussed by Eckstein et al. in U.S. Pat. No. 6,894,614 which issued May 17, 2005, for a Radio Frequency Detection and Identification System, some RFID systems operate with resonant tags for identifying articles to which the resonant tag is attached or the destination to which the articles should be directed. It is taught that the use of resonant circuit tagging for article identification is advantageous compared to optical bar coding in that it is not subject to problems such as obscuring dirt and may not require exact alignment of the tag with the tag detection system, and that typically, systems utilizing multiple tuned circuit detection sequentially interrogate each resonant circuit with a signal having a frequency of the resonant circuit and then wait for reradiated energy from each of the tuned circuits to be detected.

In the prior art applicants are also aware of U.S. Pat. No. 6,703,930 which issued Mar. 9, 2004, to Skinner for a Personal Alerting Apparatus and Methods, wherein Skinner teaches the detecting of an occurrence of an event and notifying a user of the event as well as the nature of the event. Skinner discusses that a sensor may be configured to poll for the presence of an RFID tag to determine the presence, absence, or proximity of an object bearing the tag, giving the example of detecting a family pet that has strayed outside of a detectable range for the tag. Skinner also discusses that a receiver may be configured to trigger an automatic response to a given event, giving the example that the receiver is configured to initiate or control the operation of either an actuator that is connected to a valve or the like, or an electrical switch or the like so as to in response initiate the operation of the respective valve or switch, giving the examples of automatically turning off a water supply valve in response to a flood message, or turning off an electrical power switch in response to a fire message. Skinner also discusses that a message may be presented to the user in at least one of several modes, including audible, visual, mechanical, or electrical sensory-based.

In the prior art, applicants are also aware of U.S. Pat. No. 6,861,959 which issued Mar. 1, 2005, to Torres Sabate et al. wherein it is described to provide radio beacons, both fixed and portable, and receiver units including those carried by pedestrians, or combination transceivers for pedestrians, it being described that a user may carry a receiver with them so as to be advised of different danger zones when traversing areas with radio beacon coverage. The example is given that in the case of warning messages, these are produced sufficiently beforehand to permit the user to take avoiding action free from surprise, suggesting the user reduce speed or bring the vehicle to a complete stop, depending on the case. It is also taught to provide mobile warnings to warn of the closeness and situation of a moving hazard. It is also taught to incorporate a mobile transceiver in moving vehicles or install a transceiver element in the case of pedestrians or cyclists, the example being given of the types of warning including the transporting of dangerous loads such as inflammable or corrosive materials as well as the proximity of cyclists, joggers, horse riders or motorcyclists.

As set out above, previous attempts to use RFID tags to enhance the safety of personnel working around moving equipment have proved unsatisfactory. Previous systems employing RFID tags have not been sufficiently tied in to the operating system of the piece of equipment and therefore have only provided an audible warning to the operator of the equipment or the individual wearing the RFID tag when the worker gets too close to the equipment. Due to the loud noise levels at many such worksites, these types of audible signals may be insufficient to adequately ensure that the piece of equipment does not continue to strike the worker. In addition, there has been resistance to implementing immobilization of such equipment in response to proximity of RFID tags due to the adverse impact that such immobilization will have on the productivity of the job site. In particular, stopping the movement of a machine results in at least a portion of time during which the machine is not performing its intended function and therefore the overall efficiency of the industrial process is reduced. An additional difficulty with prior uses of RFID tags for safety devices has been the location of only a single RFID tag at a point source locatable on the user. Such a point source RFID tag may be susceptible to being screened or blocked from being read by an antenna on a vehicle depending on the orientation of the body of the worker wearing such a tag and therefore may potentially result in a false negative reading for the presence of an RFID tag. Such a false negative reading may in turn lead to the piece of equipment striking and injuring the worker.

In particular, what is missing in the prior art, and which is an object of the present invention to provide, is an RFID based personnel safety system for use in industrial settings where, within the workplace environment, mobile and/or articulated heavy and light duty machinery is routinely used in proximity to personnel, other than the operator of the machinery, who are required by the nature of their duties to pass by in proximity to such mobile or articulated machinery, and to shutdown motion of such machinery or elements thereof when proximity of personnel within defined danger zones arise in situations raising a likelihood of physical collision between the machinery and detected personnel.

SUMMARY OF THE INVENTION

An RFID based personnel safety system according to the present invention includes a radio-frequency (RF) transponder tag to be worn by workmen, the transponder in discontinuous radio frequency communication with a machine-mounted RF transponder detection system for detecting the transponders on the workmen. The machine-mounted RF transponder detection system may include an RF transponder interrogator connected to at least one antenna and a processor and/or programmable logic controller (PLC), which in turn cooperates with electromechanical controls on the machine. Transponder tags worn by the user workmen may be passive RFID transponders not requiring batteries.

According to a first embodiment of the present invention there is disclosed a method of selectively immobilizing equipment to ensure the safety of a proximate worker, the method comprising:

providing an article of clothing wearable by the proximate worker, the article of clothing having a RFID tag having an antenna distributed about the article of clothing so as to substantially surround a worker wearing the article of clothing;

sensing the proximity of the RFID tag to a portion of the equipment; and stopping the movement of a portion of the equipment in response to the sensing.

The method may comprise providing a visual indicator on the article of clothing. Sensing may comprise stopping the movement of the portion of the equipment when the RFID tag is less than a first distance from the portion of the equipment. The method may comprise providing an audible signal when the RFID tag is less than a second distance from the portion of said equipment. The second distance may be greater than the first distance.

According to a further embodiment of the present invention there is provided a system for selectively immobilizing equipment to ensure the safety of a proximate worker, the system comprising:

an article of clothing wearable by the proximate worker, the article of clothing having a RFID tag having an antenna distributed about the article so as to substantially surround a worker wearing the article of clothing;

a sensor sensing the proximity of the RFID tag to a portion of the equipment; and stopping means for stopping the movement of the portion of the equipment in response to the sensing.

The sensor may comprise at least one sensing antenna defining a zone for sending and receiving signals to and from the RFID tag within the zone, a transceiver for generating an receiving signals from the at least on antenna and a processor for comparing the signals received by the antenna against values representing distance of the RFID tag to the antenna. The system may comprise a plurality of sensing antennas, all cooperating with the transceiver, wherein the plurality of antennas are mounted adjacent corresponding danger zones on the equipment. The sensing antennas may be directional antennas directionally detecting the RFID tags within preselected danger zones around the equipment.

The stopping means for stopping may comprise a switch adapted to interrupt the movement of the portion of the equipment. The switch may comprise an electrical disconnect switch. The switch may comprise an electromechanical valve actuator.

The system may further comprise a visual indicator on the article of clothing. The visual indicator may comprise a reflector wherein the article of clothing comprises a safety vest.

The stopping means may be adapted to stop the movement of the portion of the equipment when the RFID tag is less than a first distance from the portion of the equipment. The system may further comprise an audible signal generator for generating an audible signal when the RFID tag is less than a second distance from the portion of the equipment. The second distance may be greater than the first distance.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 6b is a back view of the safety vest of FIG. 6a.

DETAILED DESCRIPTION OF EMBODIMENTS OF THE INVENTION

Figure 1:
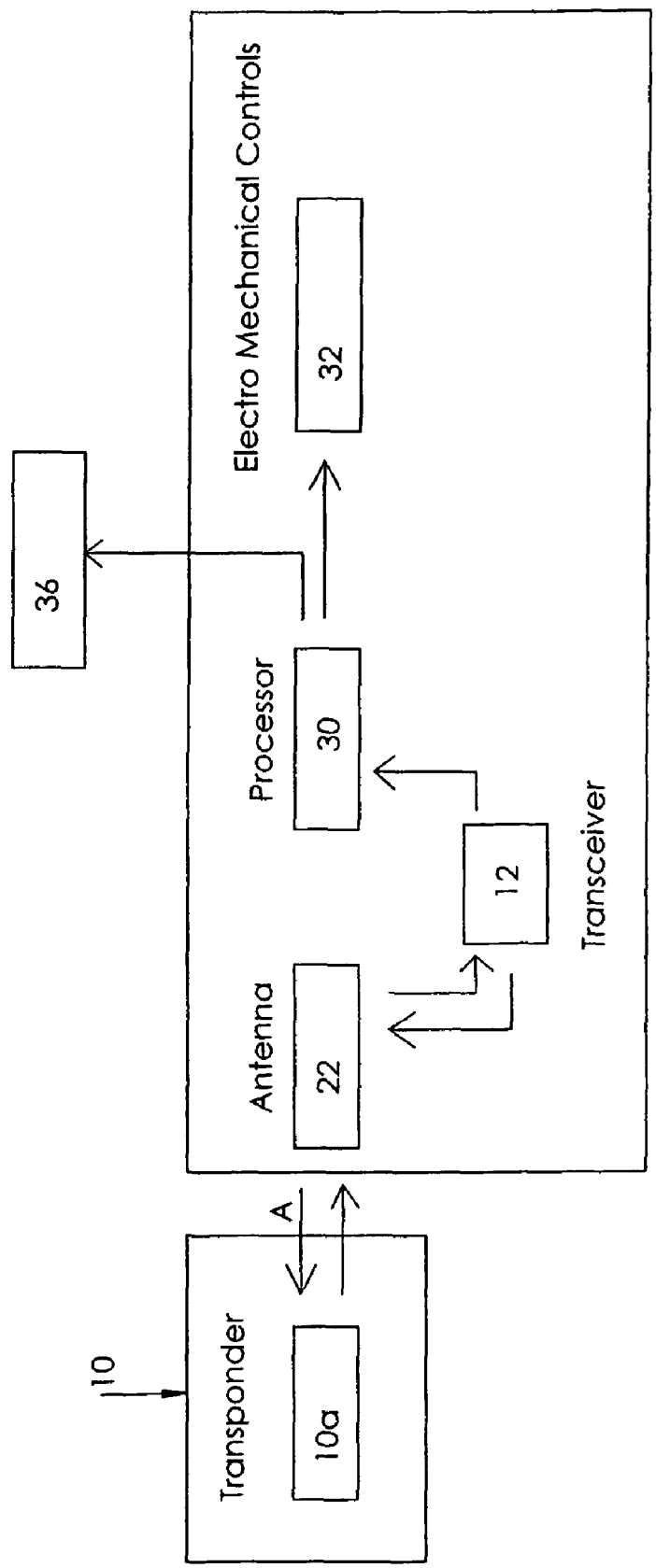
FIG. 1 is a diagrammatic view of an RFID transponder tag and the corresponding RFID transponder detection system.

As seen in the accompanying Figures, wherein similar characters of reference denote corresponding parts in each view, the RFID based personnel safety system according to one aspect of the present invention includes an RFID tag 10 which contains a transponder 10a. The tag may for example be worn by a workman 14 either on an item of clothing 16, or on a hardhat 18 or the like.

Transponder 10a within tag 10 is in discontinuous radio frequency communication such as indicated by arrow line A with a transponder detection system 20. Transponder detection system 20 includes at least one antenna 22, which, in a preferred embodiment, may be one or more directional antennas, cooperating with transceiver 12.

In the case of use of a single antenna, it can be an omnidirectional antenna, unidirectional antenna, or, preferably, a directional antenna, such as for example a dipole antenna or yagi antenna taught in the prior art, for increased directionality and range.

Multiple antennae 22 may also be used to increase the directionality and/or range of the system such as, for example, a phased antenna array. These directional and/or ranging antennae can enhance the ability of the operator to detect the proximity of personnel hidden from the view of the machine operator.

The transceiver 12 generates an interrogatory signal that is transmitted via the at least one antenna 22 in the direction of travel of the machine or the direction of the moving or otherwise articulated part of the machine. This signal activates the transponder 10a, and therefore is of appropriate frequency and power to activate a transponder within the desired detection ranges.

An alert signal coming from the workmen's RFID tag 10 is received by the antenna 22 on the machine, routed through the transceiver 12, and then transmitted to the processor 30. In the processor 30, the signal is received by a microprocessor (not shown) that processes the signal and generates the appropriate output to a user interface such as an alarm or status display, and to a controller for example a PLC and actuator so as to shut off the machine or disable the machine's movement or any part thereof. Thus the outputs generated may include a sensory alarm to alert the operator to the presence of the workman within the detectable range or ranges of the system. The sensory alarms may be visual, auditory, or any other appropriate sensory alarm, and combinations thereof.

For example, in situations where there is a high level of background noise, an audible alarm alone may be insufficient to ensure alerting of the operator, and therefore other alarms, such as a flashing red or strobe light, may be installed on the machine such as in the user interface. The outputs may further include RFID encoded data read from the workman's tag 10, such as a unique identifier which may be recorded by the processor 30 in its associated memory for later replay to display, for example, the identity of the workman, the speed of the travel of the machine, location information (if the system is GPS equipped) of the workman relative to the machine, etc. These outputs can be generated by information transmitted from the workman's RFID tag 10, or can be information that is stored in the processor 30 and its memory, or in a related server computer cooperating wirelessly with the processor, and which information is correlated to the unique identifier transmitted to the transponder detection system.

Additionally, the processor 30 may be designed to enable simultaneous detection of multiple tags or multiple workmen. In systems using multiple antennae 22, the direction of the tag's 10 movement in relation to the machine transponder detection system can be more accurately determined. For example, it is known in the prior art that multiple, divergent yagi antennae can be arrayed to allow the differentiation of the alert signal into sectors; for example, into three sectors such as dead ahead, proximal left side, and proximal right side.

Figure 2:
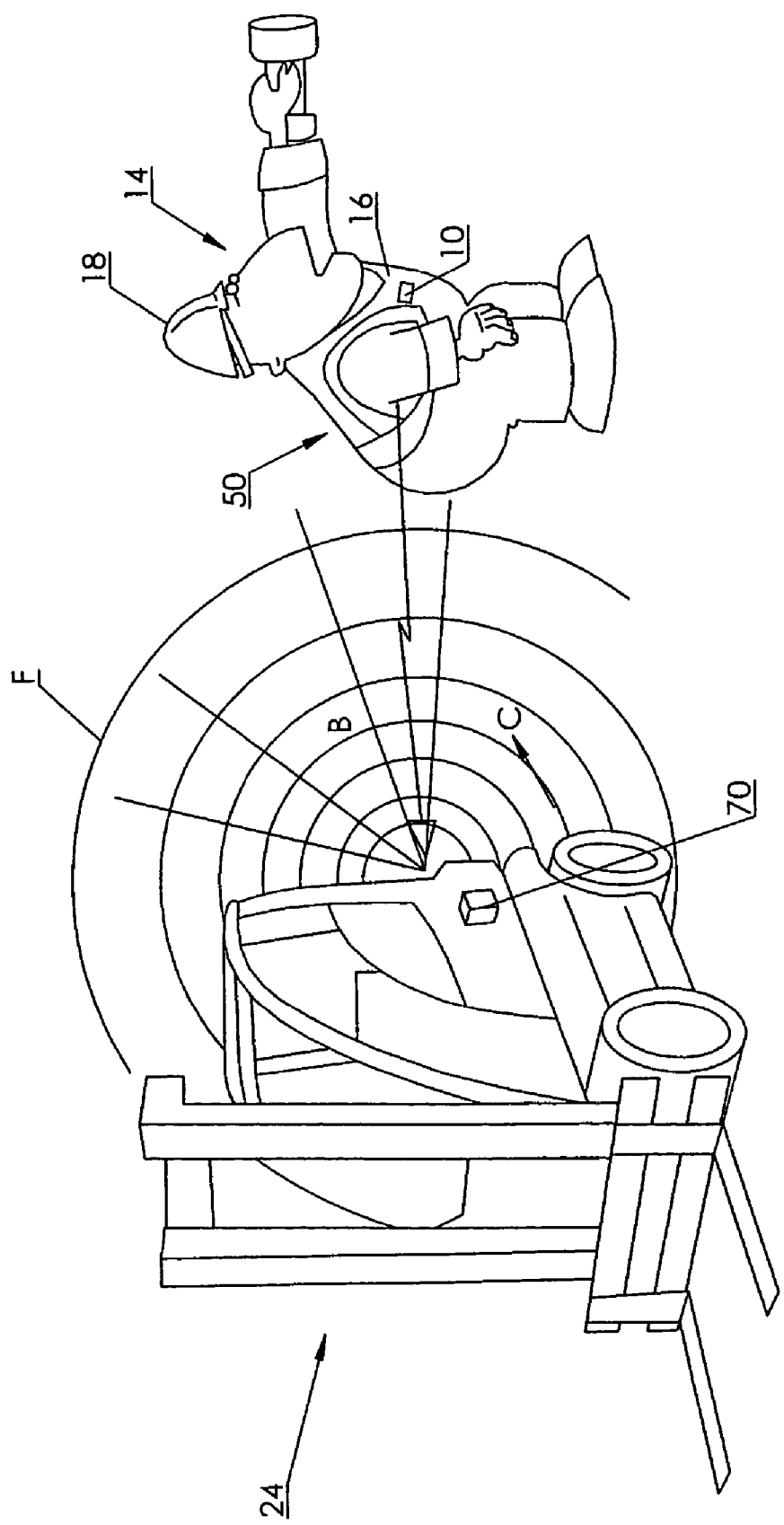
FIG. 2 is a front perspective view of a forklift in proximity to a workman wearing a safety vest according to one aspect of the present invention.
Figure 3:
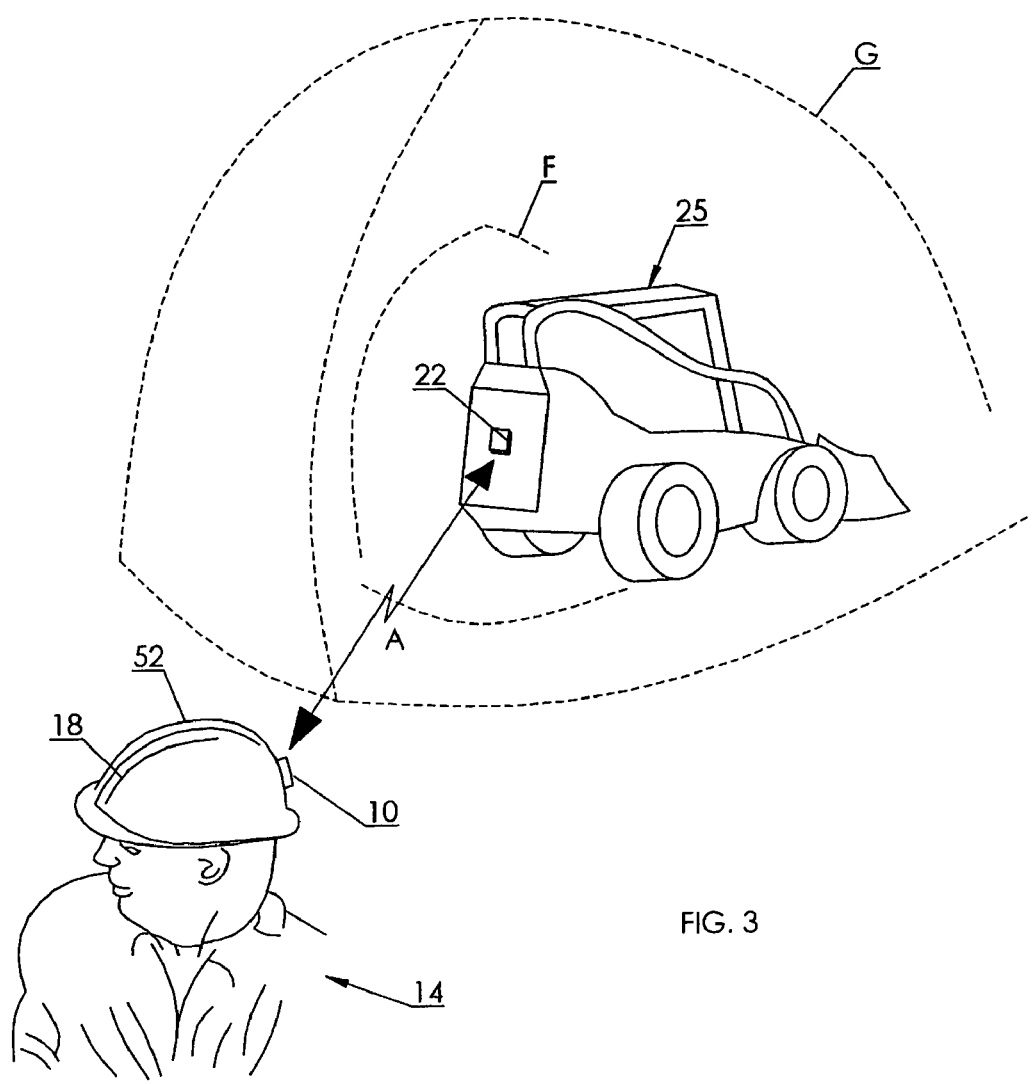
FIG. 3 is a rear perspective view of a skid-steer loader in proximity to a workman.
Figure 4:
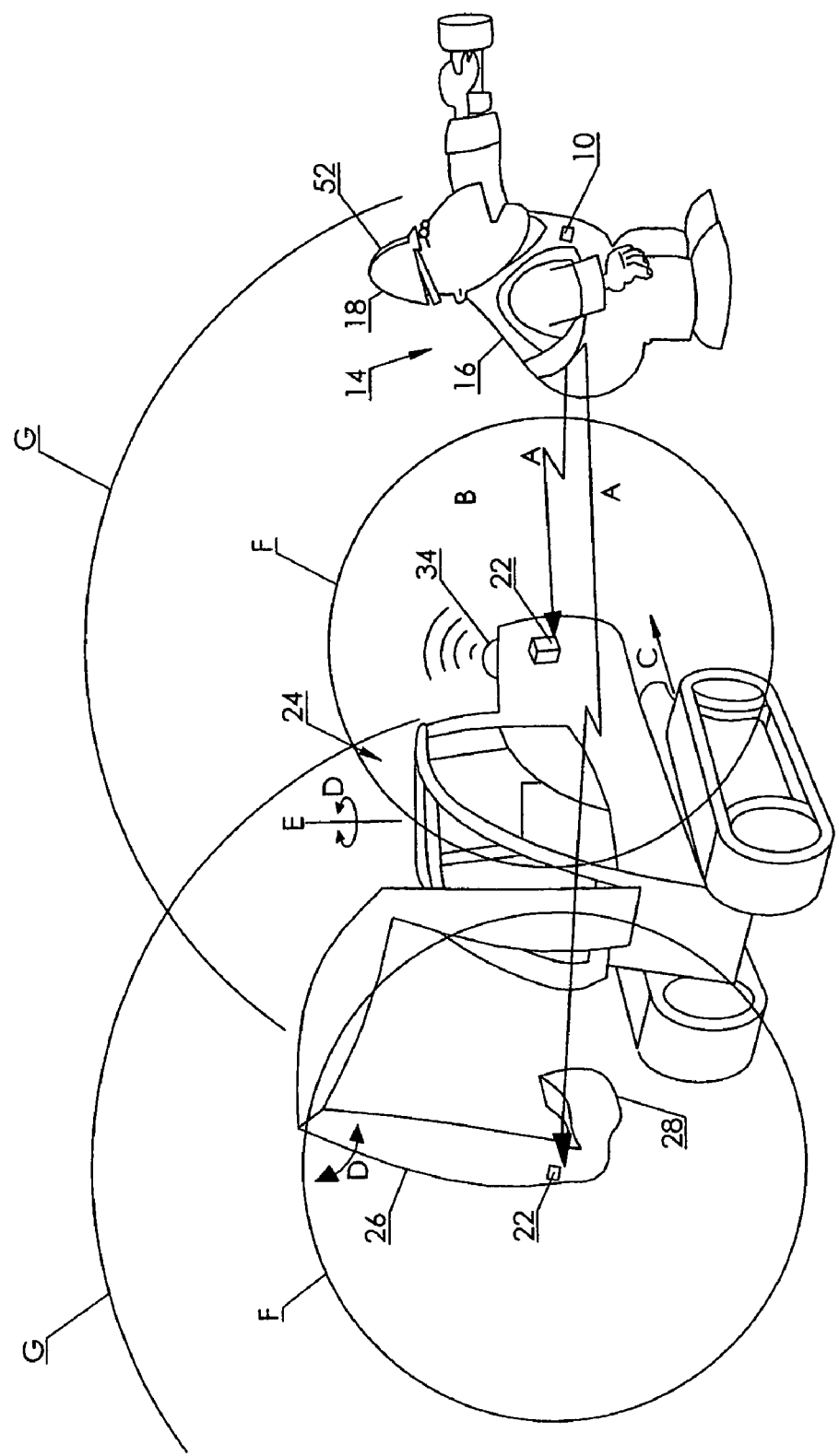
FIG. 4 is a front perspective view of an articulated excavator in proximity to a workman.

Transponder detection system 20 is mounted onto a mobile or articulated machine 24 which may include, without limitation, a forklift such as seen in FIG. 2, a skid steer front end bucket loader such as seen in FIG. 3, or a tracked excavator such as seen in FIG. 4. The tracked excavator is an example of a machine which is both mobile and articulated. By way of example, a danger zone generally indicated by reference numeral B, where workman 14 may be hidden from view of an operator (not shown) of machine 24, may include a zone to the rear of a forklift, loader, excavator or other mobile machine. Advantageously then, an antenna 22 is mounted to the rear of machine 24 so as to poll to the rear danger zone of the machine for the presence of an RFID tag 10 so as to determine the proximity of a workman 14 bearing a tag 10 and in particular during rearward translation of machine 24 in direction C.

Optionally, the system may include an ultrasound sensor 70 mounted on the machine. The ultrasound sensor 70 may be activated in response to detection of an RFID tag 10 by the antenna 22. The ultrasound sensor 70 will emit and measure ultrasound frequencies reflected off the person wearing the RFID tag 10 to determine the distance of the person wearing the RFID tag from the machine 24. Where the processor 30 determines, based upon the input from the ultrasound sensor 70, that the worker wearing the RFID tag is moving away from the machine, it may permit the machine to continue moving. However where the processor 30 determines based on the measurements of the ultrasound sensor 70 that the worker is moving towards the machine, it may shut down the movements of the machine before otherwise safe distances are reached.

Where machine 24 is articulated, for example so as to swing a machine component such as excavator arm 26 and its associated bucket 28 in direction D about axis of rotation E, the danger zone is within the area swept out by the arc of arm 26 and bucket 28 as it is rotated, constrained by the freedom of motion of the arm and bucket. Thus the danger zone associated with an articulated machine component may be completely independent of the direction of translation of the machine, if mobile. Thus advantageously a separate antenna 22 is provided cooperating with the transponder detection system 20, for example mounted on the distal end of arm 26. Thus, even if machine 24 is moving away from workman 14 such that no alarm need be generated by a first antenna 22 mounted on the rear of the machine 24 detecting the workman in the rear danger zone, the simultaneous articulation of a machine component such as arm 26 in a direction towards workman 14 may cause a proximity warning as transponder detection system 20 detects the proximity of the workman's tag 10 by the processing of the proximity detection information by processor 30.

In one embodiment of the present invention, a single detection read-range and its corresponding detection zone, indicated in the Figures diagrammatically as spheres or sphere sectors F which are not intended to be limiting, correspond to an inner danger zone wherein physical contact or striking of the workman by the machine is imminent and consequently processor 30 is programmed to immediately cause controls 32 such as, for example electrical, mechanical or electromechanical controls, on the machine to shut off the machine or at least halt its movement or the movement of the articulated machine component in the direction of the workman. In one embodiment a switch 36 may be utilized to interrupt the power supply for at least a part of the machine.

The transponder detection system may also include an emergency shut off switch to shut off the machine through the controls 32 when activated by a user. In a preferred embodiment, in addition to the inner read range corresponding to the inner danger zone F, transponder detection system 20 also simultaneously monitors an outer read range corresponding to an outer danger zone G, again indicated diagrammatically in the Figures as a sphere or spherical sector which again are not intended to be limiting. The inner danger zone may, for example, be four to six feet, again depending on the particular application and relative velocities, within which to activate an automatic machine motion shut-down or automatic machine component motion shut-down. In a preferred embodiment, processor 30, when a tag 10 is detected within an outer danger zone G, but outside of inner danger zone F, causes a warning or alert to at least the operator of machine 24 and preferably to both the operator of the machine and to workman 14 before workman 14 comes into closer proximity so as to for example be detected within inner danger zone F causing automatic shut-down of the machine movement. The outer danger zone F may for example be approximately fifteen feet may provide for example a two to three second warning (depending on relative velocities between the workman and machine) to the workman and the machine operator. The automatic alarm or alert caused by the detection of a tag 10 within the area bounded between the outer perimeter of inner danger zone F, and the outer perimeter of outer danger zone G, may include any suitable sensory warning device, or combination of those, including audible warning by such as a siren or klaxon or whistle etc., or visual warning including a flashing strobe 34 or the like, or a mechanical vibrator such as seat mounted or mounted within tag 10 so as to notify the operator and workman 14 of the proximity alarm.

Figure 5:
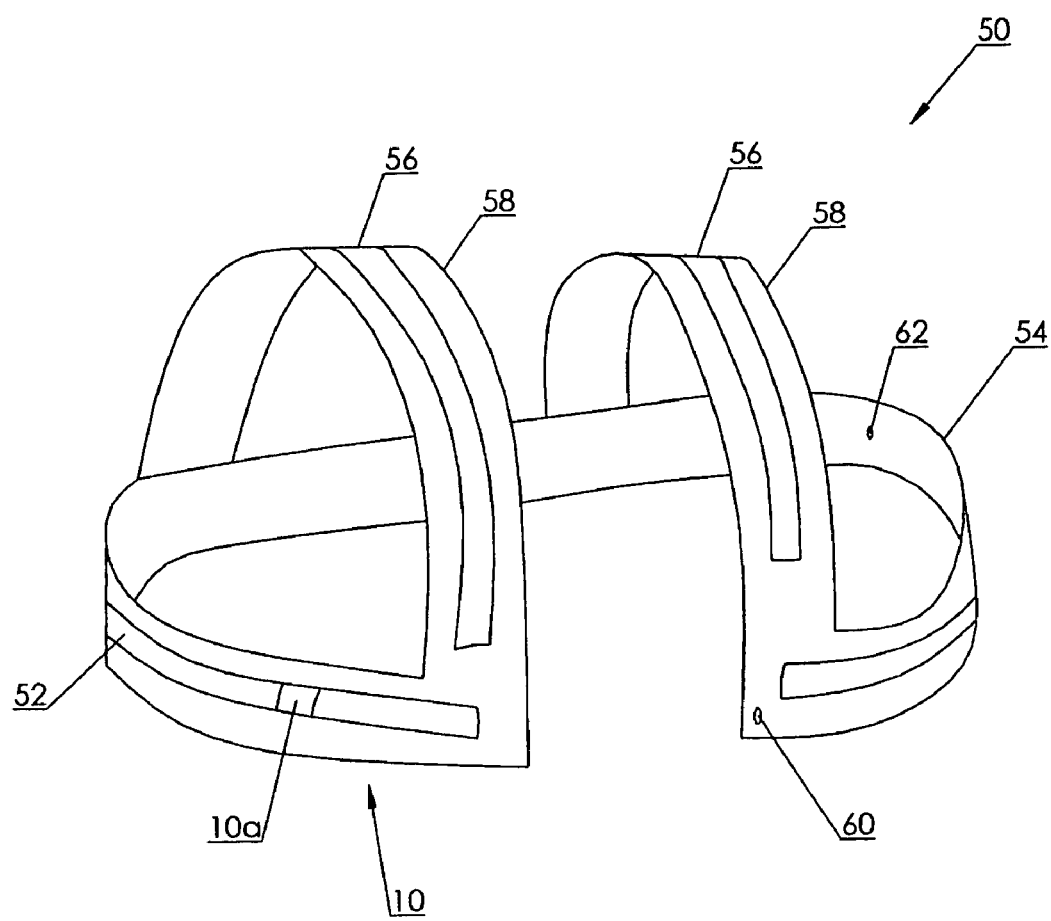
FIG. 5 is a front perspective view of a safety vest having an RFID tag with a distributed antenna.

Turning now to FIG. 5, a safety vest 50 is illustrated incorporating an RFID tag for use in cooperation with the transponder detection system 20. The safety vest 50 includes an RFID tag 10 having a RFID transponder 10a and an antenna 52 distributed around the vest 50. As illustrated in FIG. 5, the antenna 52 may be oriented along a circumferential portion of the safety vest 54 so as to substantially surround the wearer of the safety vest. It will be appreciated however that the antenna 52 may also be oriented along other members of the safety vest so as to provide a plurality of outwardly projecting surfaces of the safety vest having a portion of the antenna, and that the antenna may be mounted in other articles of outer apparel which would be worn by a workman, for example reflective hats, coats, gloves, rain slickers, etc. Collectively when used herein the term "safety vest" is intended to include all such outerwear. The use of a plurality of outwardly projecting surfaces to include a portion of the antenna on the safety vest ensures that at least one portion of the safety vest which includes part of the antenna is oriented towards a proximate antenna 22 mounted on the vehicle so as to ensure accurate sensing of the RFID tag 10.

The antenna 52 may be secured to for example helmet 18, or an outer surface 60 of safety vest 50. Optionally, the antenna 52 may be woven into or otherwise secured within the fabric of the safety vest 50 or secured to an inner surface 62 thereof. Safety vest 50 also includes shoulder straps 58 having strips of a reflective material 56 so as to provide a visual indicator of the presence of the wearer to the operator of the piece of equipment. To re-state then, it will be appreciated that an RFID tag having a distributed antenna 52 may also be incorporated into other articles of clothing such as for example a jacket, a hard hat or a pair of safety pants, by way of non-limiting examples. It will also be appreciated that the reflective material 56 may also be secured to and oriented around such an article of clothing by methods which are well known in the art.

Figure 6A:
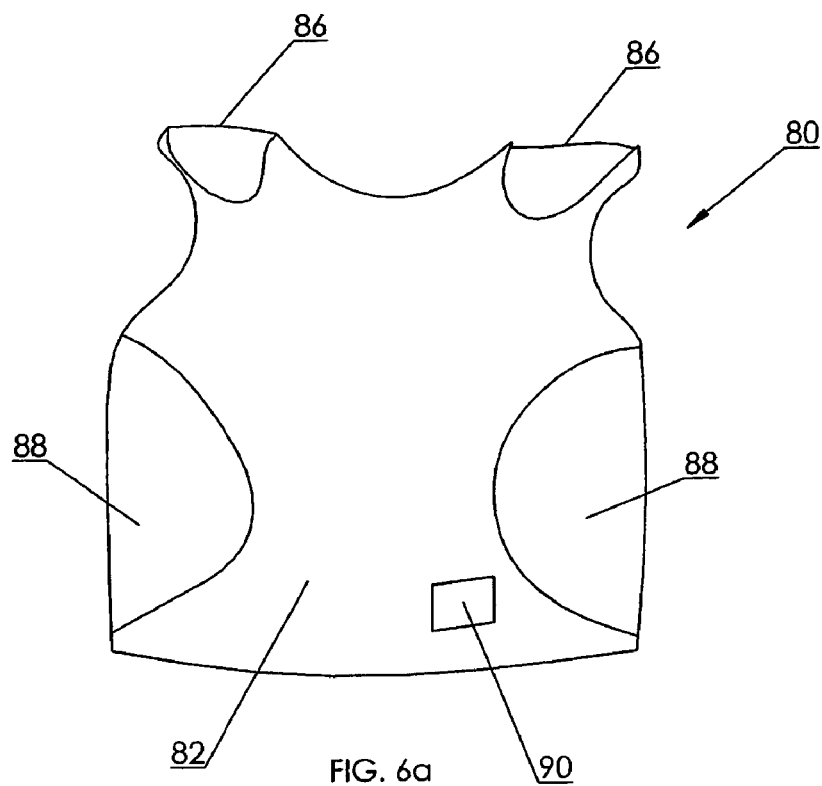
FIG. 6a is a front view of a safety vest according to a further embodiment of the present invention.
Figure 6B:
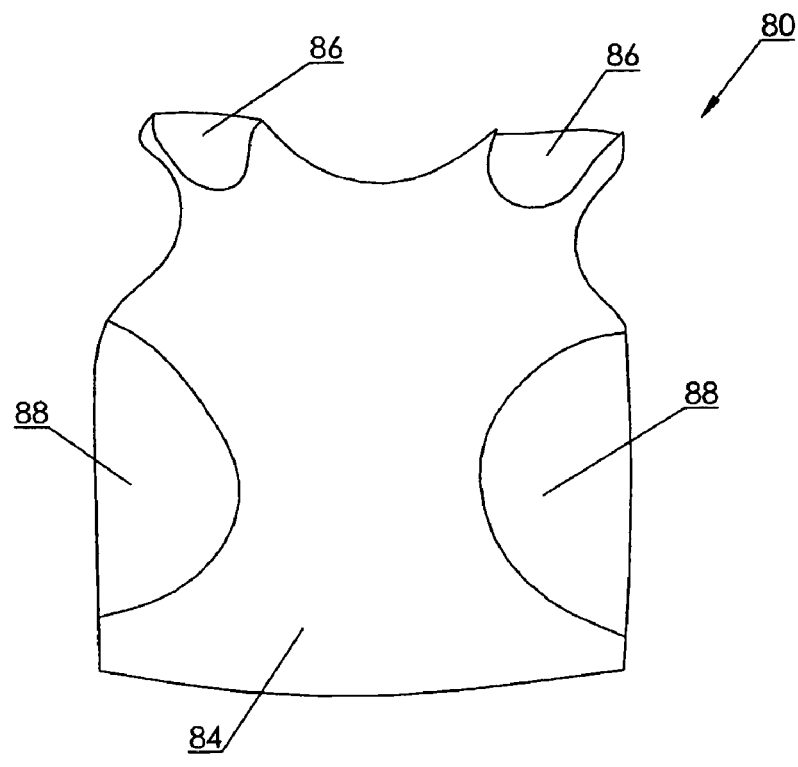

An alternative embodiment of a safety vest 80 is illustrated in FIGS. 6a and 6b. The front 82 of the safety vest 80 is illustrated in FIG. 6a while the back 84 of the safety vest 80 is illustrated in FIG. 6b. The safety vest 80 includes shoulder antenna areas 86 and side antenna areas 88. The shoulder and side antenna areas 86 and 88 each wrap around the safety vest 80 so as to be exposed to both the front and back 82 and 84 of the vest for continuous communication with the antenna 22. The shoulder and side antenna areas 86 and 88 may include a single or multiple antennas therein for receiving the signals from the antenna 22. Accordingly each frequency or frequency band to be utilized may have a separate antenna within the shoulder and side antenna areas 86 and 88. Optionally, a single antenna in each area may be operable to receive signals of all utilized frequencies.

The safety vest 80 may also include a warning indicator 90 for warning the wearer of a detected dangerous proximity to a machine 24. The warning indicator 90 may comprise by way of non-limiting example an audible, visible or vibrating device such as a siren, a flashing light or a vibrator.

As may be understood due to the nature of the directional nature of the hazard discussed herein, it will be appreciated that it is advantageous that antennas 22 and ultrasound sensors 70 be directional antennas as discussed above. This is because in many applications of the present invention for example on mobile equipment, especially in congested industrial areas such as warehouses in the forklift example, it is important that the mobile equipment be able to function throughout the work shift without being needlessly shut down, or without needless alarms being triggered because of workman who are passing by or working close to the machine but who are not within the actual spatially limited danger zone within which the likelihood of physical collision is greatly increased. These various spatially limited danger zones will depend on the type of machinery and the application. The examples given herein are not intended to be limiting but are merely illustrative of the principle so that a spatially limited danger zone may be focused on so that, when proximity of a workman, whether man or woman, within such a zone triggers an alarm causing the machine or machine motion to be shut down or otherwise temporarily disabled, it will only occur when there is a significant probability that the workman is in fact in imminent danger or that the relative closing velocity is such that in a very short period of time the workman will become in imminent danger.

Thus it is advantageous to use a two-tier or multiple tier or progressive proximity detection and warning system such as described above. In one embodiment, for the two or several different ranges required for example for the inner read range and the outer read range, different radio frequencies may be employed. The processor may monitor vehicle speed, and determine the relative closing distance for example using the ultrasound sensor 70 so as to factor in that, for example, the response time required for a piece of machinery to slow or stop will increase typically with the increased velocity of the machine approaching the workman. The processor will thus adjust or the system will otherwise adjust, for example, the inner read range accordingly so as to provide increased reaction time to allow for the lag between detection and implementation of an automatic machine shut-down and stopping of the machine. The processor may also optionally include a user input, such as, for example a dial, or a computer interface such that a user may be able to adjust the dimensions of the inner and outer ranges F and G, respectively for any desired zone.

Optionally, multiple frequency signals may be transmitted by the antenna 22 which may activate the RFID tag 10 so as to reduce holes and propagation errors. For example the antenna 22 may transmit, and the RFID tag 10 be operable to receive, frequencies of multiple bands or an ultra-wide band frequency as they are known. In addition, the transceiver 12 and antenna 22 may be adapted to produce a pulsed signal from the antenna 22 for use in locations where a continuous radiofrequency signal would result in propagation and reflection errors.

It is not intended that the present invention be limited to the mobile equipment depicted in the figures. The principle according to the present invention is intended to be applicable to mobile equipment, stationary articulating equipment, and other industrial and commercial processes and related machinery so as to protect personnel including workmen, pedestrians, or others, or animals, for example livestock, from coming into accidental contact or impact with such mobile or articulated equipment.

As part of the method of use of the present invention, the transponder tags 10 may be tested periodically or for example before every work shift by the workman having to pass the workman's corresponding tag through an interrogator station (not shown) which tests for the one or several frequencies being employed and recognized by the transponder detection system. For example if the transponder responds to all frequencies interrogated, a visual or audible signal will indicate a pass, or a further visual or audible signal will inform the workman or an inspector if one or more interrogated frequencies on the transponder fail when polled.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for selectively slowing or immobilizing an articulating mobile machine to ensure the safety of a proximate worker, wherein the machine includes a first component which translates in a first direction and an articulated component which articulates in a second direction different from the first direction, the method comprising:

providing a wearable article wearable by the proximate worker, said wearable article having a RFID tag and having a tag antenna cooperating with said tag, providing a first sensor and mounting said first sensor to the first component of the articulating mobile machine, and detecting the proximity of one of more of said RFID tags to the first component, providing a second sensor and mounting said second sensor to the articulated component of the articulating mobile machine, and detecting the proximity of said RFID tags to the articulated component, wherein said tag antenna is distributed about said article of clothing such that a worker wearing said article of clothing is detected by said first and second sensors from substantially any position relative to the worker, wherein said first and second sensors comprising a plurality of directional antennas each defining a corresponding danger zone for sending and receiving signals to and from said RFID tags within said corresponding danger zone, providing a transceiver, said transceiver generating and receiving signals from said directional antennas, and providing a processor, said processor determining distances of said RFID tags to each antenna of said plurality of directional antennas, and controlling slowing or stopping of the translation or articulation of respectively the first component or the articulated component of the mobile machine in response to a corresponding said detection, wherein said plurality of directional antennas are mountable adjacent said corresponding danger zones on the first component and the articulated component, wherein said directional antennas when mounted on the first component and on the articulated component respectively directionally detect said RFID tags within said danger zones corresponding to the first component so as to detect said RFID tags located in the path of said translation of the first component in said first direction, and so as to detect said RFID tags within said danger zones corresponding to the articulated component so as to detect said RFID tags located in the path of said articulation of the articulated component in said second direction, said processor cooperating with said first and second sensors to detect and locate said RFID tags and cooperating with the first component and the articulated component to both detect said translation of the first component in the first direction and said articulation of the articulated component in the second direction, said processor determining a velocity corresponding to each of said RFID tags within each said corresponding danger zone and determining relative closing velocities and distances between said RFID tags and the first component and the articulated component, determining whether said relative velocities and distances will place a corresponding said RFID tag within a corresponding danger zone, wherein the size of said corresponding danger zone is determined by said processor and is dependant on said relative closing velocities and distances, and wherein when said corresponding danger zone collision of at least one of said RFID tags with the first component or the articulated component is imminent as determined by said processor, said processor controlling said slowing or stopping of said translation, and controlling slowing or stopping of said articulation, and in the event of said processor determining said collision is said imminent, said processor activating said slowing or stopping of the first component, or activating said slowing or stopping of the articulated component independently of said slowing or stopping of said slowing or stopping of the first component, wherein said articulated component is said slowed or stopped without said slowing or stopping of the first component, in order to avoid said imminent collision, and wherein said first and second sensors and said processor detect said RFID tags in warning zones immediately adjacent and outside of said danger zones, and wherein, upon such detection of said RFID tags in said warning zones said processor activating a warning signal to the corresponding workman wearing the corresponding said article of clothing and to an operator of the mobile machine, whereby upon said detection of said RFID tags by said sensors, and upon said warning signaling when said RFID tags are in said warning zones, or upon said slowing or stopping of the first component or the articulated component when said RFID tags are in said danger zones, collisions are avoided between workers wearing said RFID tags and the first component or the articulated component having respectively and first and second sensors mounted thereon.

2. The method of claim 1 wherein said tag antenna is provided mounted to said wearable article, said wearable article chosen form the group comprising: clothing, vest, hard-hat.

3. The method of claim 1 wherein said signals said generated and received by said transceiver are multiple frequency signals.

4. The method of claim 3 wherein said signals said generated and received by said transceiver are frequencies of multiple bands.

5. The method of claim 4 wherein said signals said generated and received by said transceiver are an ultra-wide band frequency.

6. The method of claim 1 wherein said signals said generated and received by said transceiver are pulsed signals.

7. A system for selectively slowing or immobilizing an articulating mobile machine to ensure the safety of a proximate worker, wherein the machine includes a first component which translates in a first direction and an articulated component which articulates in a second direction different from the first direction, the system comprising:

a wearable article of clothing wearable by the proximate worker, said wearable article having a RFID tag and having a tag antenna cooperating with said tag, a first sensor mountable to the first component of the articulating mobile machine for detecting the proximity of one of more of said RFD) tags to the first component when said first sensor is mounted to the main component, a second sensor mountable to the articulated component of the articulating mobile machine for detecting the proximity of said RFID tags to the articulated component when said second sensor is mounted to the articulated component, wherein said tag antenna is distributed about said article of clothing such that a worker wearing said article of clothing is detected by said first and second sensors from substantially any position relative to the worker, said first and second sensors comprising a plurality of directional antennas each defining a corresponding danger zone for sending and receiving signals to and from said RFID tags within said corresponding danger zone, a corresponding transceiver for generating and receiving signals from said directional antennas and a processor for determining distances of said RFID tags to each antenna of said plurality of directional antennas, and said processor adapted to control slowing or stopping of the translation or articulation of respectively the first component or the articulated component of the mobile machine in response to a corresponding said detection, wherein said plurality of directional antennas are mountable adjacent said corresponding danger zones on the first component and the articulated component, wherein said directional antennas when mounted on the first component and on the articulated component respectively directionally detect said RFID tags within said danger zones corresponding to the first component so as to detect said RFID tags located in the path of said translation of the first component in said first direction, and so as to detect said RFID tags within said danger zones corresponding to the articulated component so as to detect said RFID tags located in the path of said articulation of the articulated component in said second direction, said processor cooperating with said first and second sensors to detect and locate said RFID tags and cooperating with the first component and the articulated component to both detect said translation of the first component in the first direction and said articulation of the articulated component in the second direction, said processor adapted to determine a velocity corresponding to each of said RFID tags within each said corresponding danger zone and determining relative closing velocities and distances between said RFID tags and the first component and the articulated component, and adapted to determine whether said relative velocities and distances will place a corresponding said RFID tag within a corresponding danger zone, wherein the size of said corresponding danger zone is determined by said processor and is dependant on said relative closing velocities and distances, and wherein when said corresponding danger zone collision of at least one of said RFID tags with the first component or the articulated component is imminent as determined by said processor, said processor then adapted to control said slowing or stopping of said translation, and to control slowing or stopping of said articulation, and in the event of said processor determining said collision is said imminent, said processor adapted to activate said slowing or stopping of the first component, or to activate said slowing or stopping of the articulated component independently of said slowing or stopping of the first component wherein said articulated component is said slowed or stopped without said slowing or stopping of the first component, in order to avoid said imminent collision, and wherein said first and second sensors and said processor are adapted to detect said RFID tags in warning zones immediately adjacent and outside of said danger zones, and wherein, upon such detection of said RFID tags in said warning zones said processor is adapted to activate a warning signal to the corresponding workman wearing the corresponding said article of clothing and to an operator of the mobile machine, whereby upon said detection of said RFID tags by said sensors, and upon said warning signaling when said RFID tags are in said warning zones, or upon said slowing or stopping of the first component or the articulated component when said RFD tags are in said danger zones, collisions are avoided between workers wearing said RFID tags and the first component or the articulated component having respectively and first and second sensors mounted thereon.

8. The system of claim 7 wherein said tag antenna is provided mounted to said wearable article, said wearable article chosen form the group comprising: clothing, vest, hard-hat.

9. The system of claim 7 wherein said signals said generated and received by said transceiver are multiple frequency signals.

10. The system of claim 9 wherein said signals said generated and received by said transceiver are frequencies of multiple bands.

11. The system of claim 9 wherein said signals said generated and received by said transceiver are an ultra-wide band frequency.

12. The method of claim 7 wherein said signals said generated and received by said transceiver are pulsed signals.

* * * * *